United States Patent

Steinhoff

[15] 3,652,000
[45] Mar. 28, 1972

[54] COMBINED CAR-TOP CARRIERS AND SHELTERS

[72] Inventor: Neal K. Steinhoff, Pioneer Place, Route #1, Verona, Wis. 53593

[22] Filed: Nov. 6, 1970

[21] Appl. No.: 87,488

[52] U.S. Cl. ................... 224/42.01, 296/23 R, 224/42.1 E
[51] Int. Cl. ................................................. B60m 11/00
[58] Field of Search ............... 224/42.1 E, 42.1 R, 42.1 H, 224/42.1 B, 29, 42.01; 296/23 R, 23 A

[56] References Cited

UNITED STATES PATENTS

| | | | |
|---|---|---|---|
| 2,012,193 | 8/1935 | Heinsen | 296/23 R |
| 3,008,784 | 11/1961 | Allard | 224/42.1 E |
| 2,710,977 | 6/1955 | Fannin | 296/23 R X |

*Primary Examiner*—Gerald M. Forlenza
*Assistant Examiner*—Jerold M. Forsberg
*Attorney*—Joseph G. Werner, Theodore J. Long, John M. Winter and James A. Kemmeter

[57] ABSTRACT

A car-top carrier having a housing of generally rectangular configuration providing a top-opening main storage compartment and a side-opening secondary compartment. A pair of opposing side doors, mounted on vertical hinges, close the second compartment and swing open to provide supports for a tarpaulin unrolled from a shelf in the secondary compartment to form a protective shelter at one side of the automobile.

4 Claims, 5 Drawing Figures

PATENTED MAR 28 1972

INVENTOR:
NEAL K. STEINHOFF

Joseph G. Werner
John McWinter
ATTORNEYS

PATENTED MAR 28 1972 3,652,000

INVENTOR:
NEAL K. STEINHOFF

*Joseph E. Werner*
*John W. Winter*
ATTORNEYS

COMBINED CAR-TOP CARRIERS AND SHELTERS

BACKGROUND OF THE INVENTION

1. Field of the Invention

This invention pertains generally to the field of camping and more particularly to a car-top carrier for transporting camping equipment and providing a shelter for cooking and the like at the side of the automobile.

2. Description of the Prior Art

Car-top carriers have attained wide use in camping for transporting equipment and in facilitating campers to set up their camps quickly and easily. This latter quality is of special importance to those persons who travel each day between campsites. Their camps are usually set up toward evening with the intention that they be dismantled the next morning and stored for that days traveling.

Presently known carriers do not make adequate provision for the occasions when the so-called traveling campers wish to interrupt their journey only to prepare a quick meal. It is, of course, certainly impractical to set up the entire camp for such an occasion. To the best of my knowledge no car-top carriers are available on the market or known that provide separate storage compartments for food, cooking utensils and the like and another compartment for general camping equipment such as tents and luggage, nor are there any car-top carriers which provide an extensible roof to provide a sheltered area at the side of the vehicle in conjunction with the cooking equipment compartment.

Several vehicle carried shelter tents are known in the art. U.S. Pat. No. 3,231,161 discloses a car-top luggage rack with an extensible tent frame. The tent itself is carried either on the luggage rack or in the vehicle. U.S. Pat. No. 3,186,419 shows a tent which is carried on the top of a station wagon and set up at the rear of the vehicle while U.S. Pat. No. 2,825,351 is directed to an automobile carried tent which is adapted to be set up at the side of the automobile.

SUMMARY OF THE INVENTION

Recognizing the unfulfilled needs of campers, I have invented a unique car-top carrier and shelter unit.

The invention has a generally rectangular housing providing a top-opening main storage compartment of sufficient size to hold the usual supply of camping gear including a tent. A tarpaulin extends over the main storage compartment and is releasable along two edges to provide access to the compartment.

A side-opening secondary storage compartment is provided for food and cooking and eating utensils. A pair of horizontally swinging side doors close the secondary compartment. In open position, the doors provide supports for the other end of the tarpaulin which is rolled out over the doors from a storage shelf in the secondary compartment to provide a protected area at the side of the car for cooking and eating.

Other objects, features and advantages of my invention will be apparent from the following detailed description taken in conjunction with the accompanying drawings wherein a preferred embodiment of the invention has been selected for exemplification.

DESCRIPTION OF A PREFERRED EMBODIMENT

Figure 1:
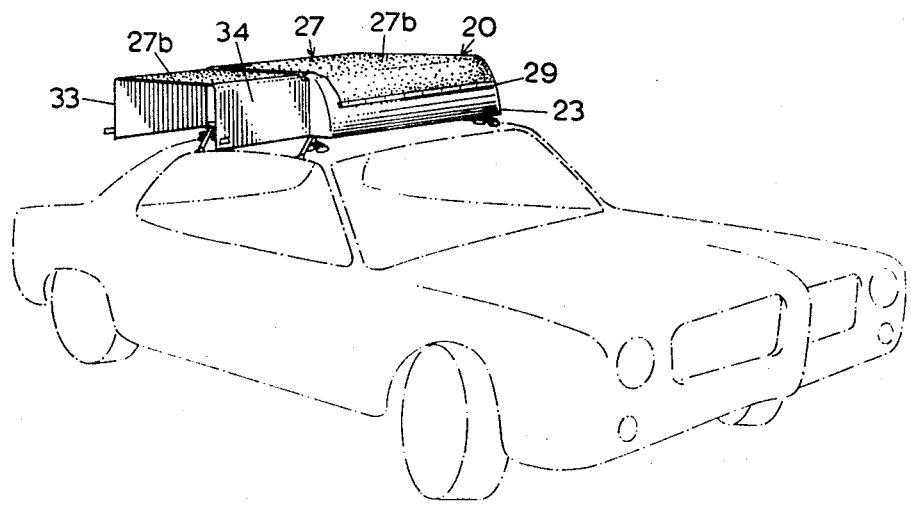
FIG. 1 is a perspective view of the car-top carrier and shelter combination showing the protective roof in extended position.
Figure 2:
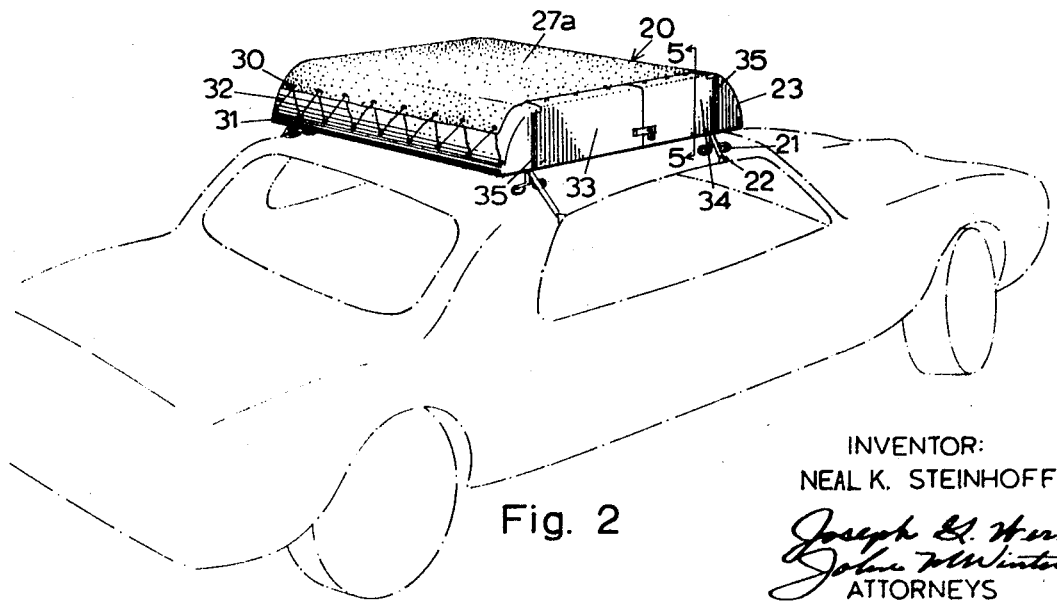
FIG. 2 is a perspective view of a car-top carrier and shelter combination in closed or travel position.

Referring now more particularly to the drawings wherein like numerals refer to like parts throughout the several views, my car-top carrier and shelter unit is generally shown at 20 in FIGS. 1 and 2 mounted on an automobile by suction cups 21 and straps 22 in the well known manner. Other means of mounting could, of course, be employed.

Figure 3:
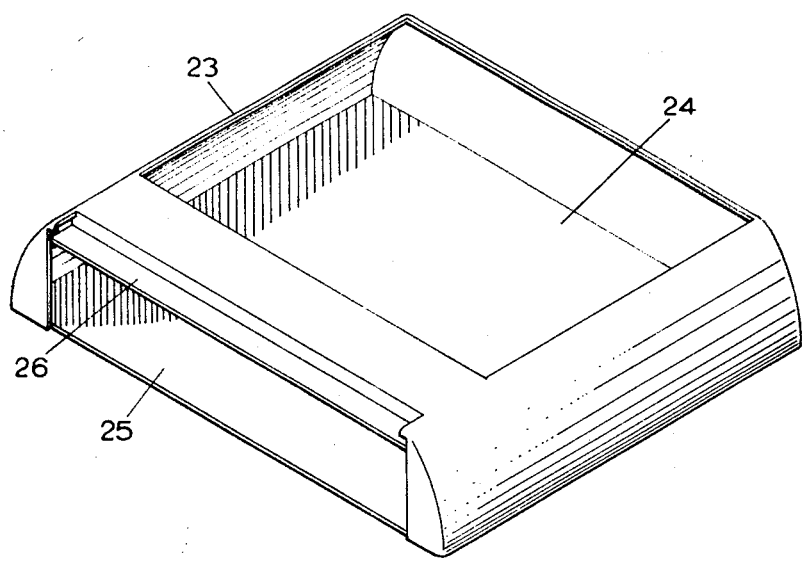
FIG. 3 is a perspective view of the open-topped housing of the car-top carrier.

As best seen in FIG. 3, the unit has an open-topped housing 23 of generally rectangular configuration providing a main storage compartment 24, a secondary storage compartment 25, and a horizontal shelf 26 extending below the top outer edge of the secondary compartment.

Figure 4:
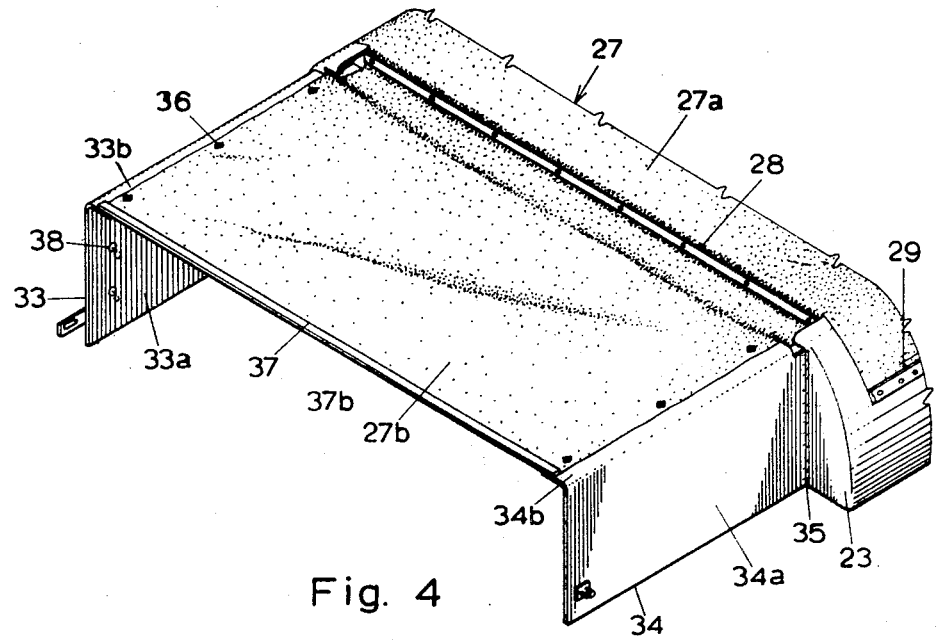
FIG. 4 is an enlarged fragmentary perspective view of the protective roof construction.

A tarpaulin 27 is fixedly secured to the carrier housing along two edges by metal clamping strips 28 and 29 as best shown in FIGS. 1 and 4. The main section 27a of the tarpaulin extends across the top of the carrier housing closing the main storage compartment 24. Eyelets 30 are secured along the rear and left edge of the tarpaulin. Hooks 31 are secured on the back and left side of the carrier housing opposite the eyelets of the tarpaulin. A stretch rope 32 is threaded through the eyelets 30 and secured at either end to the tarpaulin. The stretch rope 32 can then be easily pulled down from the tarpaulin and attached over the hooks 31 to secure the tarpaulin to the carrier housing and close the main storage compartment. Conversely, the rope 32 can be quickly released from the hooks to provide access to the main storage compartment.

The secondary storage compartment 25 is open at the right side of the carrier housing opposite the driver's side of the automobile. Side doors 33 and 34 are mounted by substantially vertical hinges 35 near the ends of the right side of the carrier housing to permit the doors to swing in a substantially horizontal plane from a first position closing the secondary storage compartment as shown in FIG. 2 to an extended open position shown in FIGS. 1 and 4.

Figure 5:
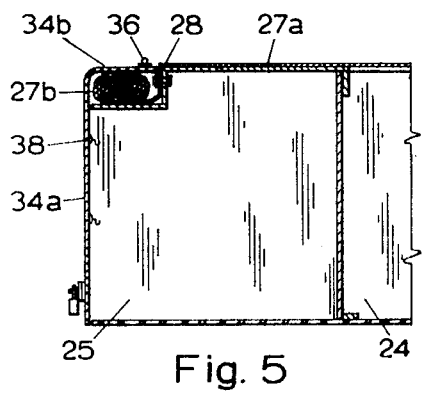
FIG. 5 is a fragmentary section view taken along line 5—5 in FIG. 2.

As shown in FIG. 5, a second section 27b of the tarpaulin 27 is stored in a compact rolled condition on the shelf 26 when the side doors 33 and 34 are closed.

As shown in FIGS. 1 and 4, when the doors 33 and 34 are opened, the tarpaulin section 27b may be unrolled over the top of the doors and releasably secured thereto by a series of eyelet holders 36. A metal or wooden slat 37 is fastened to the outer edge of tarpaulin section 27b to hold the side doors 33 and 34 in their open position. The slat 37 is also useful to facilitate the rolling up of the tarpaulin section 27b for storage when not in use.

THe swinging side doors 33 and 34 have substantially upright portions 33a and 34a which curve into transverse top portions 33b and 34b to form a cover for the tarpaulin shelf 26 when the doors are closed as shown in FIGS. 2 and 5. This particular construction has the advantage of completely exposing the rolled tarpaulin when the doors are open to facilitate the unrolling of the tarpaulin over the extended doors. The tarpaulin can then be quickly attached by the eyelet holders on the top of the side doors to provide the protective shelter at the side of the automobile.

It is preferred that the secondary compartment 25 be used exclusively to store food and all eating and cooking utensils. Hooks 38 or other fasteners may be attached to the inside surface of the side doors, as shown in FIGS. 4 and 5, and the walls of the secondary compartment, if desired, for hanging utensils and the like.

It is understood that my invention is not confined to the particular construction and arrangement of parts herein illustrated and described, but embraces all such modified forms thereof as come within the scope of the following claims.

I claim:

1. A car-top carrier comprising:

a. an open-topped housing of generally rectangular configuration having a main and a secondary storage compartment, b. a pair of side doors mounted by substantially upright hinges for swinging from a first position closing said secondary storage compartment to an extend open position, c. a tarpaulin secured to said housing for extending outwardly over said doors in said open position, and d. means releasably securing said tarpaulin to said open doors.

2. A car-top carrier as set forth in claim 1 wherein a substantially horizontal shelf extends below the top outer edge of said secondary compartment for storing said tarpaulin in a compact rolled condition.

3. A car-top carrier as set forth in claim 2 wherein each of said side doors has a substantially upright portion closing said secondary compartment and a transverse top portion extending over and forming a cover for said shelf when said doors are in said first position.

4. A car-top carrier as set forth in claim 2 wherein said tarpaulin extends over said main storage compartment in said open-topped housing.

* * * * *